Figure 2:
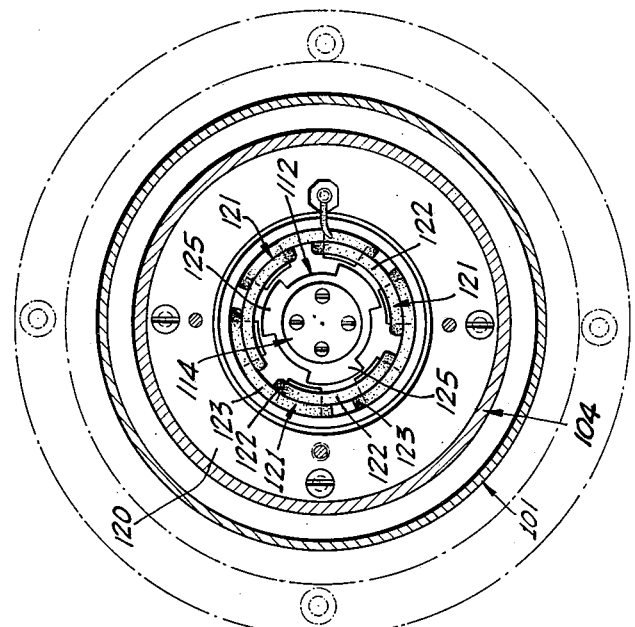

INVENTOR
MARIO Di GIOVANNI
BY
ATTORNEY

May 29, 1962   M. DI GIOVANNI   3,036,469
BEAM FLEXURE
Filed Dec. 30, 1957   3 Sheets-Sheet 2

INVENTOR.
MARIO DI GIOVANNI
BY
ATTORNEY

May 29, 1962 M. DI GIOVANNI 3,036,469
BEAM FLEXURE
Filed Dec. 30, 1957 3 Sheets-Sheet 3

INVENTOR.
MARIO DI GIOVANNI
BY
ATTORNEY

United States Patent Office 3,036,469
Patented May 29, 1962

3,036,469
BEAM FLEXURE
Mario Di Giovanni, Pacific Palisades, Calif., assignor to Statham Instruments, Inc., Los Angeles, Calif., a corporation of California
Filed Dec. 30, 1957, Ser. No. 706,159
8 Claims. (Cl. 73—514)

This invention relates to a beam flexure having relatively small torsional spring constant about an axis passing longitudinally through the beam but of substantially greater rigidity under axial compression or in bending in any direction at an angle to the axis.

In such flexures the twist obtained when the column is subjected to a torsional load is substantially large while substantially no displacement or flexure is obtained when a like force is imposed in any other direction upon said beam.

In many transducers it is frequently necessary to support members for rotary motion or other angular displacement upon weak springs which form all or a part of the restoring force to bring the member back to position after it has been displaced from position by the force or motion to be transduced. It is found that where the springs are required to be relatively weak, they are subject to distortion by the weight imposed by the suspended member. They are also subject to accidental or undeterminable deflection when the device is subjected to accidental displacement. This deflection may introduce an unknown and undesired displacement of the suspended member, and thus produce a spurious signal which may impair the accuracy of the device.

By employing the flexure of my invention, the member may be supported upon a flexure suspension whereby it will be angularly displaced in the desired degree upon application of a torsional force but will not be displaced in any substantial degree by the weight of the member or by any motion or force to be expected other than the said torsional force.

Such flexure may be employed for many other purposes where it is desired to obtain a relatively large rotation or angular displacement on application of a small force with columnar rigidity in bending or compression.

The flexure of my invention is composed of a plurality of thin sectioned sheet metal angles joined at each end to a collar by attaching the collars to the ends of the webs of the angles. All of the ends of the angles may be attached to the collar. However, a material reduction in torsional stiffness is obtained if the end of one of the sides of the angle is connected to one only of said collars, the adjacent ends of adjoining angles being unconnected from the collar at such end.

While the adjacent angles of the dihedral angles forming the angular channel may be connected as by brazing or welding, the torsional rigidity is materially less if the angles are not connected together at their apexes. This occurs if the form of the flexure is that in which both ends of all the webs are connected to the collar or if the form is that in which only one of the ends of each web is connected to a collar. In either case the torsional rigidity is less if the apexes are not connected.

Particularly useful applications of this flexure are for use as suspension of the members of angular accelerometers subject to angular displacement upon such angular acceleration.

Figure 1:
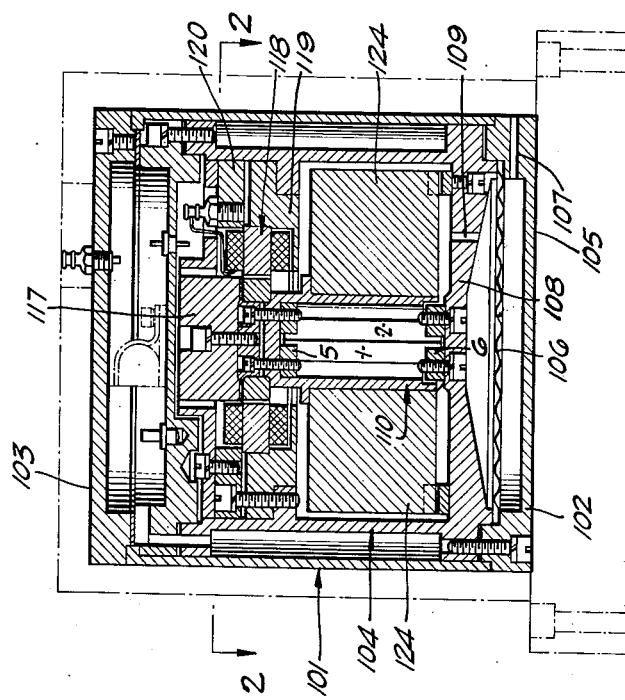
Figure 4A:
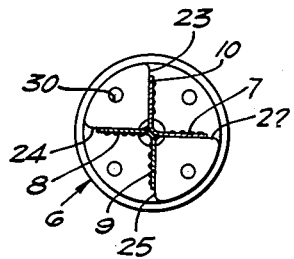
Figure 5A:
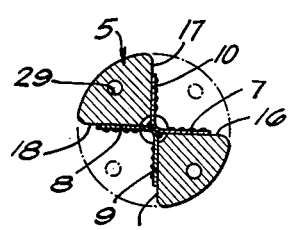
Figure 6:
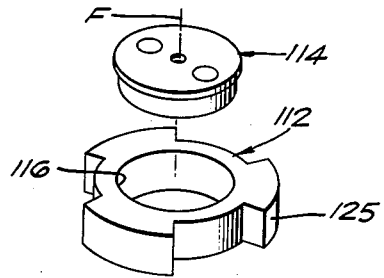
Figure 3:
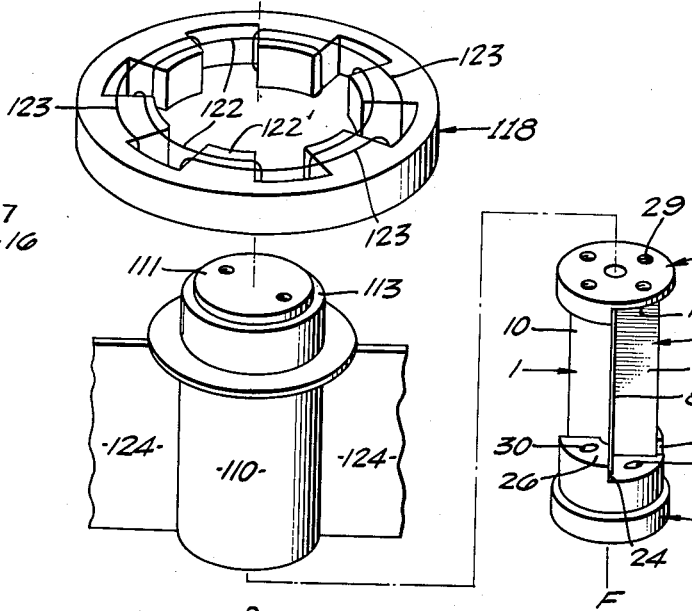
Figure 5:
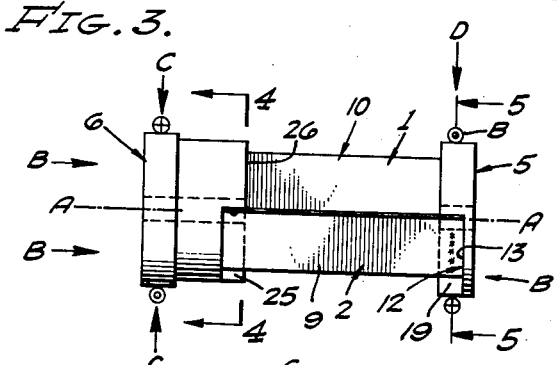
Figure 5:
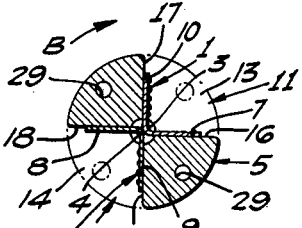
Figure 4:
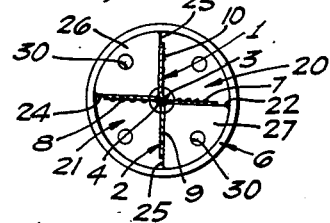
Figure 7:
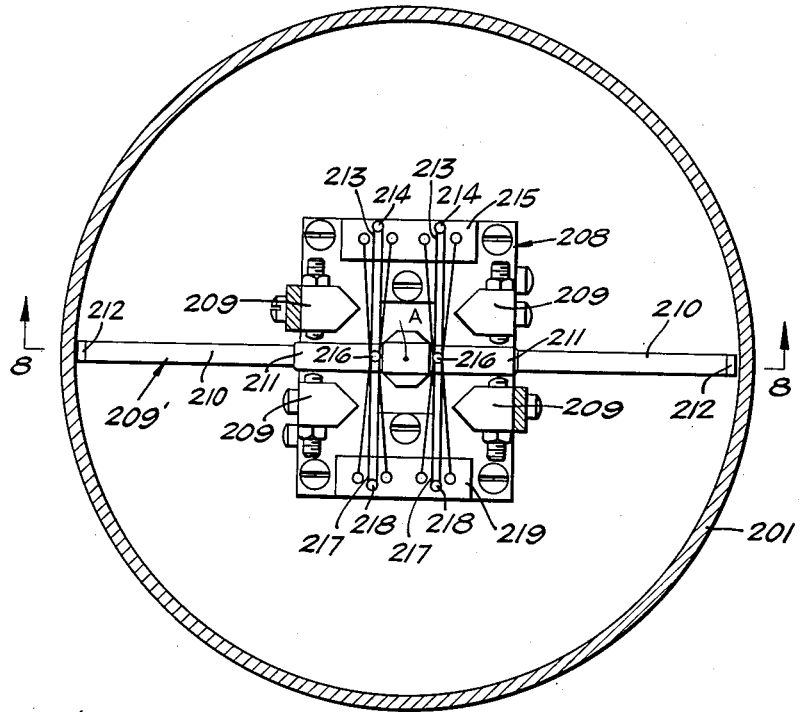
Figure 8:
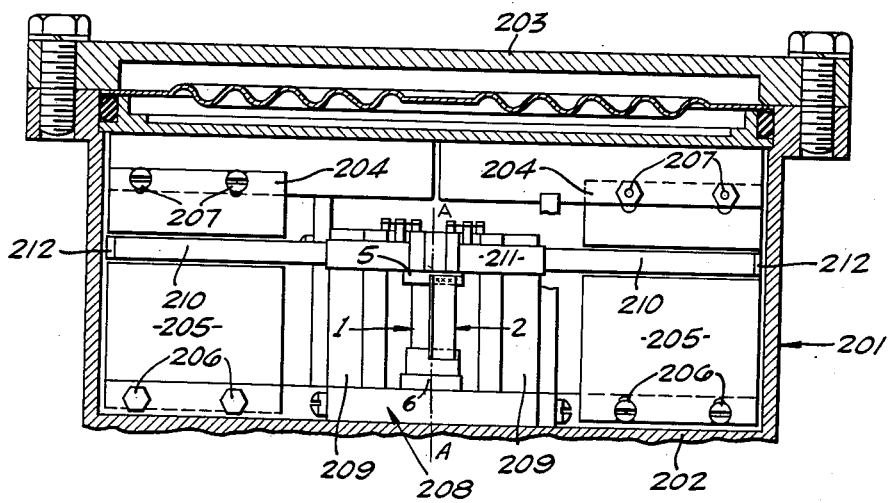

These and other objects of my invention will be further understood by reference to the following drawings, in which:

FIG. 1 is a vertical section through an accelerometer employing the flexure of this invention;
FIG. 2 is a section on line 2—2 of FIG. 1;
FIG. 3 is a plan view of my flexure;
FIG. 4 is a section on line 4—4 of FIG. 3;
FIG. 4a is a modification of the flexure sectioned on line 4—4;
FIG. 5 is a section on line 5—5 of FIG. 3;
FIG. 5a is a modification of the flexure sectioned on line 5—5;
FIG. 6 is an exploded view of the flexure support of FIGS. 1 and 2;
FIG. 7 is a section of another form of accelerometer employing the flexure of the invention; and
FIG. 8 is a section on line 8—8 of FIG. 7.

The flexure of my invention (see FIGS. 3, 4, 5 and 6) comprises two angle channel members 1 and 2, each made of flexible thin sectioned flexible metal sheet material and having a large length to radius of gyration ratio, so that each are torsionally flexible. They are mounted with their apexes 3 and 4 adjacent to each other. The dihedral angles of the channels may be 90° as in the form illustrated, but they may be set at any angle other than 90°.

The channels are mounted between two collars 5 and 6 so that the web 10 of one is aligned with the web 9 of the other angle and the web 8 is aligned with the web 7 of the other angle in a cruciform configuration. The collar 5 is notched with a 90° notch at 11 and with a like 90° notch 12 which is diametrically positioned. In the notches 11 and 12 are the quadrantal collar surfaces 13 and 14 which thus present vertical faces 16 and 17 in the notch 11 and faces 18 and 19 in the notch 12. The web 10 is spot welded to the face 17 and the web 9 is spot welded to the face 19, but the webs 7 and 8 are free at the collar 5, i.e., not connected to the faces 18 and 16.

The collar 6 is also notched out in like manner to form diametrically positioned quadrantal notches 20 and 21 with vertical faces 22 and 23 in notch 20, and 24 and 25 in notch 21, with intermediate flat quadrantal collar faces 26 and 27.

The opposite end of the web 7 is spot welded to 22 but the complementary end of 10 is not spot welded to 23 but is free. In like manner the opposite end of 9 is not spot welded to 25 but is free, while the complementary end of 8 is spot welded to 24.

Thus, an end of each web of each angle is joined to the adjacent collar while the other end is not joined to its adjacent collar. Additionally, only one of the adjacent webs of adjacent angles is connected to the adjacent collar; that is, of the plurality of ends of the webs of the collars positioned at each collar, alternate ends of the webs are connected to the collars. The webs whose end is connected at one collar are not connected at their other end to the other collar. In this manner one of the ends of the webs of each angle is united to one collar while the complementary end of the other web of the said angle is free and not united to the said collar and the other ends of the webs of the said angles are connected in like manner to the other collar in such manner that only one end of each web is connected to a collar.

Suitable mounting holes may be provided at 29 in collar 5 and at 30 in collar 6.

The two angles are not connected to each other at their apexes 3 and 4 for minimum torsional rigidity. However, the apexes may be connected but in such case the column is more rigid in torsion. Thus if a torsional force is imposed about axis A—A, the cross indicating a force perpendicular to the plane of FIG. 3 and into the plane of the figure, while the dot represents a like force directed out of the plane of FIG. 3 towards the viewer, will cause a twisting of the beam about the axis A—A. The free ends of the webs cause a large reduction in the torsional spring constant of the beam. But the structure is rigid against axial compression, i.e., forces in the direction of arrow B. It is also rigid in bending due to a force in any direction in any plane perpendicular to the axis A—A. Thus if the collar 6 is held rigid, illustrated by arrows C—C, a force against 5 in any direction in a plane perpendicular to axis A—A, for example, in the direction of the arrow D, which imposes a stress comparable to the stresses imposed by the torsional forces, will result in substantially no deflection of the beam. Thus the imposition of a torsional force imposed on the collars will cause the collars to rotate relative to each other through a torsional stress and an angle much greater than the angular displacement of the axis A, if, for example, collar 6 were held stationary and the same load exerted in the direction D as the bending load and substantially no displacement of the collar if the load be compressing in the direction B. The flexure is much more rigid in compression or columnar bending than in torsional twist.

The rigidity in axial twist will be the greater if the apexes 3 and 4 are united as by soldering or welding. It will also be more rigid if both ends of each web of each angle were spot welded to the collar. This modification is shown at FIGS. 4a and 5a, which are modifications of the flexure of FIG. 5 and in which all web ends of webs 8, 9, 10 and 7 are welded to the collars 5 and 6, as shown in FIG. 5a, i.e., to the faces 16, 17, 18, 19, 22, 23, 24 and 25. It will also be the more rigid as the thicknesss of the metal is increased or as the ratio of the web width to web length is increased. It will also be more rigid if all of the ends of the webs are connected to the notch faces. The effect of all of these factors is cumulative. The maximum rigidity in columnar bending to torsional rigidity is obtained if only one end of each of the webs is connected to its adjacent collar. This configuration, as illustrated in the drawings, is the preferred manner of reducing the torsional rigidity of a given columnar structure constructed according to my invention without materially reducing the rigidity of the column in bending or compressive load. However, it is possible to employ angles whose webs are at other than 90°, but in such case the system is much less rigid in bending than when the angles are 90° angles and the webs of the angles are arranged in cruciform manner, as described above. More than two angles may be used, as will be understood by those skilled in this art, but in such case the configuration is more rigid both in torsion and in bending than is the form illustrated.

The forms recited above are similar in that they produce a flexure whose torsional spring constant is much smaller than the spring constant or elastic modulus of column either in bending or in compression. However, the manner in which this is accomplished is not the same and thus they are not strictly equivalent devices. Thus, in the form where each of the webs is connected to the collars, all webs are angularly displaced in the same amount and equal to the angular displacement of the collars relative to each other. Thus the torsional rigidity is great as compared with the form in which each web is connected at one end only to one of the collars. In the latter case the torsional strain or twist of each of the webs, i.e., the angular displacement of the collar 6 in a direction counter-clockwise in FIG. 4 as viewed, would not cause the same angular displacement of the end of 9 at collar 6 as the end of 9 at collar 5 and also the end of collar 8 at collar 5 would move away from the surface 18 and the end of 10 moves away from the surface 23 to relieve the torsional stress in the webs, which would be induced where all ends of the webs are connected to the collar.

This relief is made greater if the apexes are not joined so that the torsional stress may be relieved. With the apexes joined by soldering, the column is stiffer and the relief of the stress in the latter forms described above is reduced, making the structure stiffer in torsion.

Such flexures are particularly useful where it is desired to maintain a member for rotation about a fixed axis in such manner that it is not displaced from position by other loading. Thus where a rotary member is intended to rotate in a given plane, the mounting of said rotor in a horizontal position or in a vertical position upon the columnar flexure of my invention of suitable dimensions will support the weight of the rotor against deflection from said plane due to its own weight or to forces other than rotary forces of desired magnitude. In like manner mounting the rotor on a vertically disposed rotor will in like manner support the rotor in its intended plane against displacements referred to above. Thus, a device containing a rotor so mounted may be positioned in any position and moved from place to place without causing substantial displacement except as a result of a torque imposed on the flexure by forces imposed on said rotor.

FIGS. 1, 3 and 6 illustrate the application of my flexure to one form of accelerometer.

The container 101 has a base 102 and a cover 103. The frame 104 is set in the base 102 to form an expansion chamber containing a diaphragm 106, which is vented by vents 107 through the base 102. The base 108 of the frame 104 carries a bore 109 which connects the interior of the frame 104 wtih the chamber 105 above the diaphragm 106.

The flexure shown in FIGS. 3 and 6 is mounted on base 108. The collar 5 is mounted on the base 108 by means of studs passing through the bores in the collars. The closed end 111 of the sleeve 110 is mounted in the end of the collar 5 and carries in assembled form the rotor 112, which rests on the shoulder 113 of the end 111. The cap 114 is inserted into the bore 116 of the rotor, and studs passing through bores in cap 114 and end 111 hold the cap 114, rotor 112 and sleeve 110 securely on the collar 5. A block 117, which may be hollow or of lower specific gravity than the liquid in which it is immersed, i.e., of less bulk density, is employed to give buoyancy to the structure suspended in the flexure, as will be further described.

The stator 118 is mounted on rig 119 carried by an internal shoulder of the frame 104 and the entire assembly is covered by a suitable frame cover assembly 120 in which the terminals of the primary 122 and secondary 123 of the transformer coils 121, which are wound on the poles 122', as is schematically shown in FIG. 6. The poles 125 of the rotor 112 are positioned such that one pole 125 spans two poles 122 (see FIG. 2).

Mounted diametrically on the sleeve 110 are two paddles 124 (see FIGS. 1 and 6). The entire space inside the frame 104 and above the diaphragm 106 is filled with an oil such that the block 117, the rotor 112, the sleeve 110, flexure 1 and the paddle 124 are immersed in the oil.

The employment of a combination of the stator 118 and rotor 112 is a well known device which gives a potential at the terminals of the secondary which is proportional to the angular displacement of the rotor from its rest position with respect to the stator.

My invention is the adaptation of the aforesaid transducer composed of the rotor and stator to a damped angular accelerometer which is sensitive to low values of the angular acceleration. Such an angular acceleration imposes a twist on the flexure 1 and causes an angular displacement of the rotor 112 with respect to the stator 118. The accuracy of the response of the system depends on maintaining the rotor concentric with the stator 118 and this requires that there be no deflection of supporting structure for the rotor. Additionally, in order that the rotor respond to small acceleration forces, it is desirable that the support have small torsional stiffness, i.e., that the resistance to angular displacement of the rotor by the supporting structure be left low.

The flexure of my invention permits of obtaining this highly desirable result. It will be seen that any acceleration in a direction at any angle to this axis F—F (FIG. 6) will not cause any displacement of the rotor from its concentric position and the output of the transformer will be responsive only to the angular displacement of the rotor about the axis F—F due to angular acceleration which produces a torsional twist in the flexure 1.

This axial twist is produced by the inertia of the liquid inside the frame 104 which produces a reaction on the paddles 124 to cause the rotation of the sleeve on the flexure and thus an angular displacement of the rotor with respect to the stator. The structure is damped due to the viscous drag of the paddles in the liquid.

The dynamic mass of the rotary assembly is modified due to the buoyancy effect of the block 117, as described below and also the paddles 124 may be made of material of lower specific gravity than the oil used and may also be made hollow. To the degree that of this buoyancy the mass is decreased, and it may actually be made almost completely buoyant. By decreasing the dynamic mass, i.e., increasing its buoyancy, i.e., until it is nearly completely buoyant, we may decrease the error introduced by any linear velocity of the device which may introduce a rotary force on the rotor. The symmetrical nature of the system aids in reducing this error. This is made additionally more effective by the substantially rigid columnar flexure to all loading other than torsional loads about its longitudinal axis passing between the apexes of the angles.

Another application of my flexure to an accelerometer is illustrated in FIGS. 7 and 8. This accelerometer is in all respects the same as that described and claimed in the Statham Patent No. 2,778,624, except that instead of supporting the paddle on the flexure referred to in said patent as a Cardan suspension, I employ my flexure to support the paddle for angular displacement. I may thus support the weight of the paddle against displacement due to its weight where it is not desired to have the paddle completely buoyant, or where the accelerometer is to be sensitive to such low values of angular acceleration such that the spring suspension can not be made sufficiently strong to support the weight of the paddle, when the paddle is not made completely buoyant, i.e., has residual weight or mass. In such case I may use my flexure which may be made of sufficiently low torsional spring constant, i.e., give a large angular displacement for a small angular acceleration and yet be sufficiently rigid to support the paddle for low values of the degree of buoyancy.

Such a device is illustrated in FIGS. 7 and 8. The case 201 with bottom 202 is covered by a cover 203 containing a pressure relief chamber similar in construction and purpose and function to 105 of the form of FIG. 1. Inside the case 201 are mounted diametric upper baffles 204 and diametric lower baffles 205. The spacing between the upper and lower baffles may be adjusted by studs 206 and 207. An island 208 centrally positioned inside case 201 carries stops 209 and a baffle 209' formed of hollow tubes 210 carried in the solid bar 211 and closed by ends 212. The bar 211 is mounted on the flexure which is shown in FIGS. 3–5 so that the collar 6 is mounted on the island and the bar 211 is mounted on the collar 5 so that the structure is balanced in weight and geometry on both sides of the axis A–A.

Electrical resistance strain wires 213 are stretched in tension between insulating pins 214 on the block 215 mounted on the island 208 and like pins 216 mounted on bar 211, and like wires 217 are stretched in tension between insulating pins 218 mounted on like block 219 mounted on island 208 and the pins 216. These wires form an electrical resistance gauge whereby the wires when connected in a Wheatstone bridge arrangement may record the angular displacement of the paddle with respect to the case in the manner described in said Statham patent. As in the Statham patent the case is filled with an oil similar to that used in the form of FIG. 1 and in said Statham patent.

While I have described a particular embodiment of my invention for the purpose of illustration, it should be understood that various modifications and adaptations thereof may be made within the spirit of the invention as set forth in the appended claims.

I claim:
1. A beam flexure comprising a plurality of angles, each angle comprising a pair of webs formed of flexible sheet metal angularly disposed in a dihedral angle, said angles disposed with their apexes adjacent each other, a collar at each end of said angles, the webs of said angles being connected to said collars, and said angles being otherwise disconnected from each other.

2. A beam flexure comprisig a plurality of angles, each angle comprising a pair of webs formed of flexible sheet metal angularly disposed in a dihedral angle, said angles disposed with their apexes adjacent each other, a pair of collars, one at each end of said angles, one of the ends of each web of each angle being connected to one collar while the other end of said web of said angle is disconnected from the other collar of said pair of collars, only one of the ends of adjacent webs being connected to a collar, so that alternate ends of the webs adjacent to said collars are connected to said collars, at said ends, the webs whose ends are connected at one of the collars are not connected to the other collar of said pair of collars at the other end of said web.

3. In the flexure of claim 2, said angles being otherwise unconnected.

4. In a motion sensing device, a housing, a mounting in said housing for one of the collars of the flexure of claim 1, a movable member secured to the other collar of said flexure, and means to sense the rotation of said member with respect to said housing.

5. In a motion sensing device, a housing, a mounting in said housing for one of the collars of the flexure of claim 2, a movable member secured to the other collar of said flexure, and means to sense the rotation of said member with respect to said housing.

6. In a motion sensing device, a housing, a mounting in said housing for one of the collars of the flexure of claim 3, a movable member secured to the other collar of said flexure, and means to sense the rotation of said member with respect to said housing.

7. A beam flexure comprising a plurality of angles, each angle comprising a pair of webs formed of flexible sheet metal angularly disposed in a dihedral angle, said angles disposed with their apexes adjacent each other, a collar at each end of said angles, one of the ends of each web of each angle being connected to one collar at one end of said angles while the other end of said web of said angle is disconnected from the other collar at the other end of said angles, opposite ends of the webs of each angle being so connected to opposite collars, and said angles being otherwise disconnected from each other.

8. In a motion sensing device, a housing, a mounting in said housing for one of the collars of the flexure of claim 7, a movable member secured to the other collar of said flexure, and means to sense the rotation of said member with respect to said housing.

References Cited in the file of this patent

UNITED STATES PATENTS

| | | |
|---|---|---|
| 2,484,823 | Hammond | Oct. 18, 1949 |
| 2,778,624 | Statham | Jan. 22, 1957 |
| 2,800,024 | Lear et al. | July 23, 1957 |
| 2,809,029 | Christoph | Oct. 8, 1957 |
| 2,819,892 | Huff | Jan. 14, 1958 |
| 2,906,522 | Wagner | Sept. 29, 1959 |
| 2,909,064 | Schoeppel | Oct. 20, 1959 |

FOREIGN PATENTS

| | | |
|---|---|---|
| 438,478 | Great Britain | Nov. 18, 1935 |
| 613,044 | Great Britain | Nov. 22, 1948 |